Nov. 16, 1954     T. F. RAINSFORD     2,694,479
CENTRIFUGAL CLUTCH

Filed Jan. 11, 1950     4 Sheets-Sheet 1

INVENTOR.
THOMAS F. RAINSFORD, DECEASED.
BY:-ELMER A. NEWGREN, ADMINISTRATOR.
William Isler
ATTORNEY.

Nov. 16, 1954

T. F. RAINSFORD 2,694,479

CENTRIFUGAL CLUTCH

Filed Jan. 11, 1950

INVENTOR.
THOMAS F. RAINSFORD, DECEASED.
BY: ELMER A. NEWGREN, ADMINISTRATOR.

William Selm
ATTORNEY.

Nov. 16, 1954 — T. F. RAINSFORD — 2,694,479
CENTRIFUGAL CLUTCH

Filed Jan. 11, 1950 — 4 Sheets-Sheet 3

INVENTOR.
THOMAS F. RAINSFORD, DECEASED.
BY:-ELMER A. NEWGREN, ADMINISTRATOR.

*William Jelu*
ATTORNEY.

Nov. 16, 1954          T. F. RAINSFORD          2,694,479
                       CENTRIFUGAL CLUTCH
Filed Jan. 11, 1950                         4 Sheets-Sheet 4

INVENTOR.
THOMAS F. RAINSFORD, DECEASED.
By:- ELMER A. NEWGREN, ADMINISTRATOR.
/s/ William Isler
ATTORNEY.

United States Patent Office 2,694,479
Patented Nov. 16, 1954

2,694,479

CENTRIFUGAL CLUTCH

Thomas F. Rainsford, deceased, late of Cleveland, Ohio, by Elmer A. Newgren, administrator, Gates Mills, Ohio Application January 11, 1950, Serial No. 137,914

6 Claims. (Cl. 192—105)

This invention relates, as indicated, to an automatic transmission and clutch, but has reference more particularly to a unit of this character designed primarily for use in connection with bicycles and the like.

A primary object of the invention is to provide a unit of the character described, comprising gears which are automatically changed without application or release of the motor or engine from the driving components.

Another object of the invention is to provide a transmission unit of the character described which has a high mechanical efficiency, yet is of simple but rugged construction, and can be manufactured at relatively low cost.

A further object of the invention is to provide a unit of the character described, having embodied therein a centrifugal clutch of unique and rugged design and construction.

Other objects and advantages of the invention will be apparent during the course of the following description.

In the accompanying drawings, forming a part of this specification, and in which like numerals are employed to designate like parts throughout the same, Fig. 1 is a side elevational view of the automatic transmission and clutch, and showing also the manner in which the unit is mounted on a bicycle;

Figure 1:
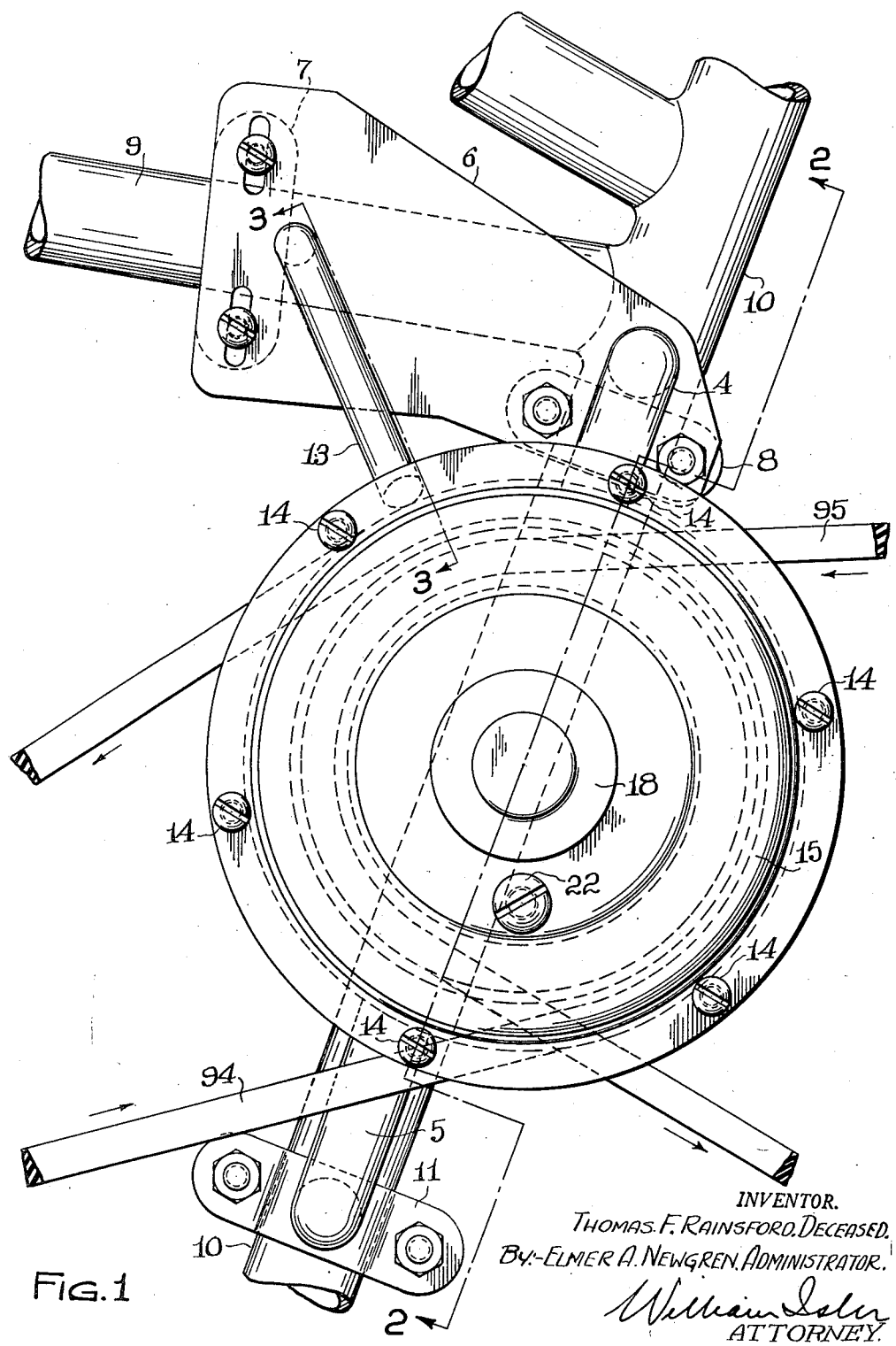

Referring more particularly to the drawings, there is a transmission support shown, comprising a support ring having a flange 2 extending radially from one edge thereof, said flange being provided with a multiplicity of circumferentially spaced, threaded openings 3. Welded or otherwise permanently secured to the support ring 1, at diametrically opposite points of the latter are tubular braces 4 and 5, which extend towards the bicycle frame.

The brace 4 is welded, at its outer end, to a cross-bar plate 6, which is removably secured, as by clamps 7 and 8, to the cross bar 9 and seat post 10, respectively, of the bicycle. The brace 5 is welded, at its outer end, to a bolt plate 11, which is removably secured, as by a clamp 12, to the seat post 10 of the bicycle. An anti-twist bar 13 is also provided, which extends between and is welded to the ring 1 and plate 6, this anti-twist bar serving to further brace the transmission support with respect to the bicycle frame.

Secured to the flange 2 of the support ring 1, as by means of screws 14 which extend into the openings 3, is a gear case, comprising an outer portion 15 and an inner portion 16. The outer portion 15 of the gear case is provided centrally thereof with an opening 17, in which a main shaft bushing housing 18 is permanently secured, the main shaft bushing 19 being disposed in this housing. The portion 15 of the gear case is also provided with an oil level opening 20, in which a boss 21 is secured, which is normally closed as by a screw 22. The inner portion 16 of the gear case is provided centrally thereof with an opening 23, in which a main bearing housing 24 is secured as by brazing. Disposed within the housing 24 is a needle or roller bearing 25.

Journalled for rotation within the bearing 25 is a clutch drive plate 26 having a hub portion 27 extending through the bearing, a thrust washer 28 being interposed between the clutch plate and housing 24. Disposed within the hub portion 27 of the clutch plate 26 are bushings 29 and 30. Journalled for rotation in the bushings 19, 29 and 30 is the main shaft 31.

Figure 4:
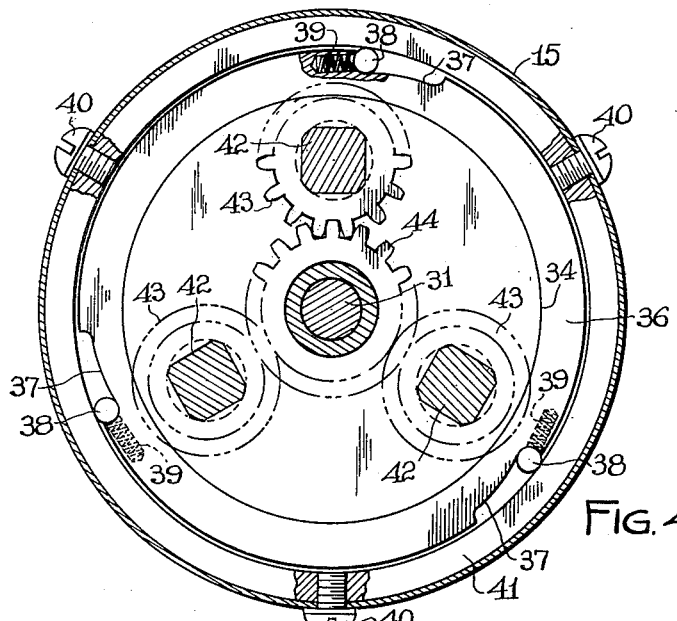
Fig. 4 is a cross-sectional view, taken on the line 4—4 of Fig. 2, and showing the position of the roller clutch when the unit is in direct drive, with the pinion gears locked.

Keyed to the shaft 31, as by a key 32, at a point adjacent the bushing 19, is a rotor driven gear 33, the hub portion of which extends through a gear carrier 34, which has secured therein, at circumferentially-spaced points, three planet gears 35, which are in mesh with the gear 33. Secured to the periphery of the gear carrier 34 is the main roller brake rotor 36 having roller slots 37 at spaced points in the periphery thereof. Disposed within these slots 37 are rollers 38, which are normally urged toward the shallower ends of the slots by means of compression coil springs 39 (see Fig. 4). Secured to the inner wall of the case 15, in radially-spaced relation to the rotor 36, as by means of screws 40, is a main rotor ring 41.

The planet gears 35 have square ends 42, upon which are mounted planet gears 43, which are in mesh with a rotor input gear 44, which has a relatively long hub portion 45 mounted on the shaft 31. The squared ends 42 of the gears 35 also have mounted thereon conical brake members 46, which are retained against axial displacement from the portions 42 by means of washers 47 and snap rings 48. The brake members 46 are adapted for braking engagement with the conical surfaces 49 of a cone brake disc 50, which is preferably made of a suitable brake material, such, for example, as Raybestos. The disc 50 is mounted on the hub portion 45 of the gear 44.

Figures 11, 12:
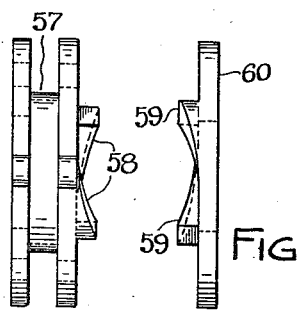
Fig. 11 is a side elevational view of one of the governor cams.
Fig. 12 is a side elevational view of the other governor cam.
Figure 10:
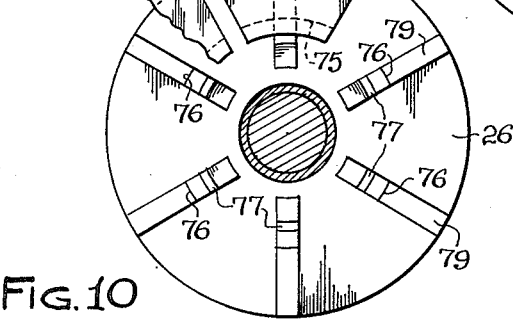
Fig. 10 is a fragmentary view, showing various parts of the main driving clutch.

Keyed to the hub portion 45 of the gear 44, as by means of a key 51, is a governor drive gear 52, having diametrically opposite sets of gear teeth 53, which are in mesh with segmental gear portions 54 of governor weights 55. The weights 55 are mounted for pivotal movement about pins 56, which are mounted in a governor cam body 57. The cam body 57 is shown in Fig. 11, and is provided, at diametrically opposite sides of one end face thereof with cams 58. The cams 58 are adapted for coaction with similar cams 59 (Fig. 12) on a governor cam 60, which is mounted on the hub portion of the gear 52 and is pinned to the latter.

Each of the weights 55 is provided with a laterally extending ear 61 (Fig. 5), to which one end of a spring 62 is secured, the opposite end of the spring being secured, as by a screw 63, to the periphery of the governor cam body 57. The governor cam body also carries, at diametrically opposite points, spring tension pins 64, which extend transversely of the cam body and are adapted to bear against the springs 62.

The hub portion 45 of the gear 44 also has keyed thereto a hub member 65, which is retained against axial displacement from said hub portion by means of a snap ring 66. A thrust washer 67 is interposed between the cam 60 and one end of the hub member 65 and is also keyed to the hub portion 45.

The hub member 65 forms part of a main clutch housing assembly, which comprises a rear housing member 68, secured to one end of the hub member, and a front housing member 69, which is brazed to the member 68 along the joint 70 therebetween.

Disposed within the aforesaid housing is a multiplicity of clutch weights 71, arranged in circumferentially spaced relation and normally urged in a radially inward direction by means of a garter spring 72, which encircles all of the clutch weights and lies in peripheral recesses 73 thereof. Each of the clutch weights is provided at its radially inward face 74 with a recess 75 of V-shaped cross-section, which is adapted to receive a correspondingly-shaped clutch tooth 76 on the arm 77 of the clutch drive plate 26. The number of arms 77 on the plate 26 correspond to the number of clutch weights. The clutch weights are also provided in one end face with radial slots 78 adapted to receive radially-extending tenons 79 on the clutch plate 26.

Keyed to the hub portion 27 of the clutch plate 26, as by a key 80, is a driver pulley hub 81 to which the driver pulley 82 is welded or otherwise rigidly secured. The hub 81 has a portion which encircles the bearing housing 24, and an oil retainer ring 83 is interposed between said portion and the bearing housing.

The hub 81 has an extension on which is mounted a starting clutch rotor 84, having roller clutch slots 85 at spaced points in the periphery thereof. Disposed within the slots 85 are rollers 86, which are normally urged toward the shallower ends of the slots by means of compression coil springs 87 (see Fig. 13).

The shaft 31 has a squared end portion 88, on which is mounted a driven pulley hub 89, to which the driven pulley 90 is welded or otherwise secured. The hub 89 has an axially extending flange 91 which encircles clutch rotor 84, in radially-spaced relation to the latter. The hub 89 is retained against axial displacement from the shaft 31 by means of a washer 92 and a snap ring 93.

The mechanism, as thus described, is an automatic 2-speed transmission and automatic clutch, and was designed primarily for use in connecttion with a bicycle, although it is to be understood that its use is not intended to be limited, in any respect, insofar as the application thereof for driving other vehicles, machines and instruments is concerned.

As applied to a bicycle drive, the pulley 82 is connected, as by an endless V-belt 94, to the motor (not shown) of the bicycle, the belt being driven in the direction indicated by the arrows in Fig. 1. The motor, in the particular bicycle for which this transmission was designed, has a maximum motor speed, at 2.5 H. P. of 3700 R. P. M., and at this speed, develops a torque of 3.56 Ft. Lbs. The pulley 90 is connected, as by an endless V-belt 95, to the rear wheel of the bicycle, the belt being driven in the direction indicated by the arrows in Fig. 1.

Figure 9:
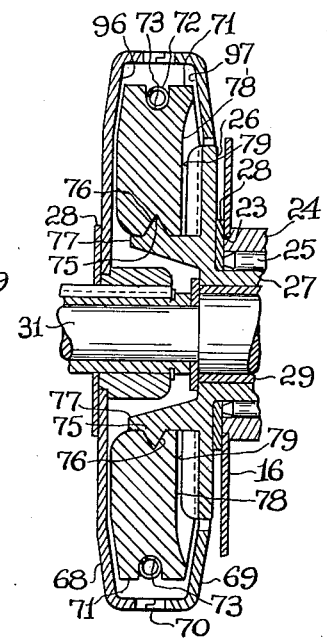
Fig. 9 is a cross-sectional view, taken on the line 9—9 of Fig. 8, but showing the main driving clutch in disengaged or neutral position.

When the motor is idling, the pulley 82 rotates at low speed, and the clutch plate 26, which is keyed to the pulley 82, also rotates at low speed, in a counter-clockwise direction, as viewed in Fig. 1. This speed is insufficient to cause the clutch weights 71 to overcome the radially inward force exerted thereon by the garter spring 72, so that the clutch weights remain in the disengaged or neutral position shown in Fig. 9. The shaft 31 is therefore not driven and no power is delivered.

Figure 7:
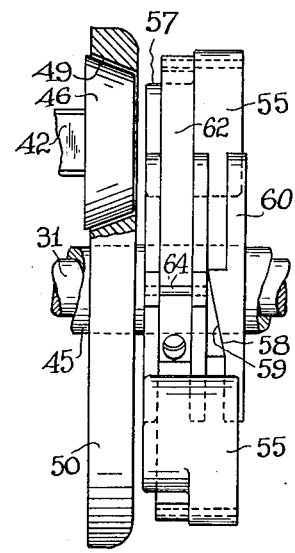
Fig. 7 is a view similar to Fig. 6, but showing the governor weights in collapsed condition, with the cone brakes free, and all gears operative (low speed and neutral position)

As the motor speed increases, the clutch weights 71 are moved radially-outwardly, due to centrifugal force, which overcomes the effect of the spring 72, gradually moving into engagement with the conical surfaces 96 and 97 of the clutch housing. Due to the conicity of the engaging surfaces of the clutch weights and clutch housing, a gradual, smooth, yet positive, clutching action is effected, and the clutch is long-lived, the clutch weights taking up their own wear. As the clutch is thus engaged, the governor weights 55 are in the collapsed position shown in Fig. 7, and in broken lines in Fig. 5, in which position of the parts, the cone brakes 46 are out of engagement with the cone brake disc 50 (see Fig. 7). A drive is thus effected through the intermediary of gear 44 (which rotates in a counterclockwise direction, as viewed in Fig. 1), planet gears 43, planet gears 35, gear 33, key 32, shaft and pulley 90. This produces a "low" gear drive. Since a certain amount of resistance is offered to the rotation of the gear 33, there is a tendency for gear carrier 34 to rotate in a direction opposite to that of the shaft 31, or in a direction as indicated by the arrow in Fig. 4. However, at this point, the rollers 38 become wedged between the slots 37 and inner wall of the clutch ring 41, thereby preventing further rotation of the carrier 34 in said direction.

Figures 2, 3:
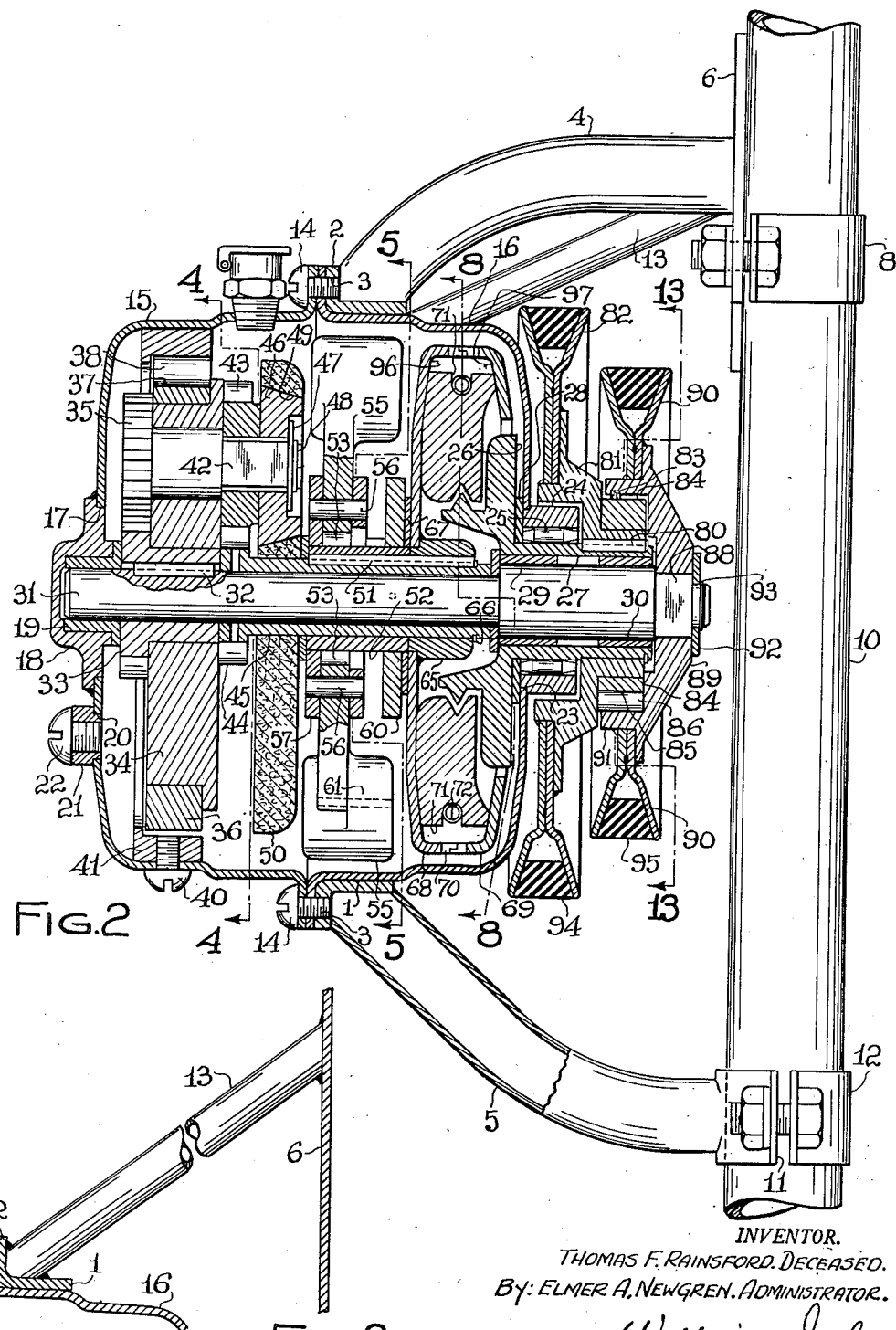
Fig. 2 is a cross-sectional view, taken on the line 2—2 of Fig. 1, and showing the unit when in direct drive, with no gears in motion, and the governor weights fully extended.
Fig. 3 is a fragmentary cross-sectional view, taken on the line 3—3 of Fig. 1.
Figure 5:
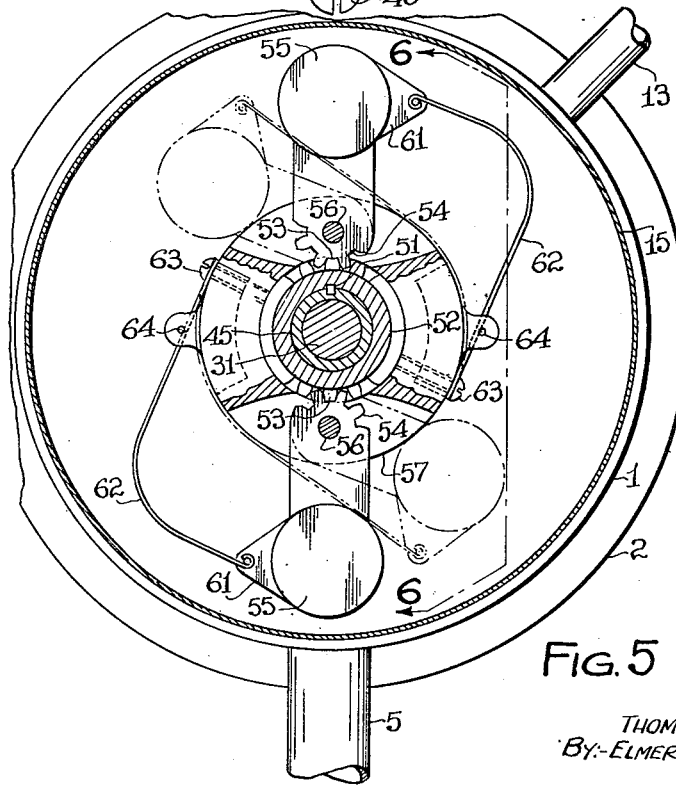
Fig. 5 is a cross-sectional view, taken on the line 5—5 of Fig. 2, and showing the governor mechanism, with the solid lines showing the position of the governor weights when the unit is in direct drive, and no gears are in operation.
Figure 6:
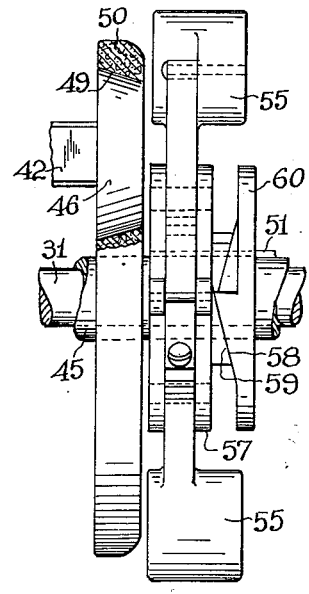
Fig. 6 is an elevational view, taken on the line 6—6 of Fig. 5, and showing the cone brake and gears in locked condition, for direct drive.
Figure 8:
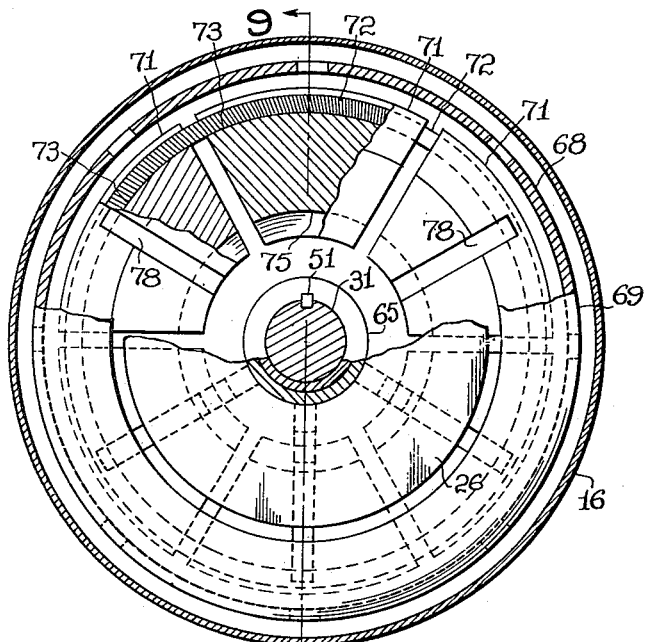
Fig. 8 is a view, partly in elevation and partly in section, taken on the line 8—8 of Fig. 2, showing the main driving clutch in engaged position.

When the motor speed reaches a predetermined point, the acceleration of the gear 44 reaches a point at which the reaction between the gear 52 and gear segments 54 on the governor weights 55 tends to swing the weights from the position shown in broken lines in Fig. 5 to the solid lines shown in this figure, and also in Fig. 6, this action being, of course, resisted by the springs 62. This action or movement causes relative rotation between the cam 56 and gear 53, as a result of which the cams 58 and cams 59 cooperate to move the parts to the position shown in Figs. 2 and 6. In this position, the cone brakes 46 are in braking engagement with the cone brake disc 50, thereby locking the planet gears 43 against rotation relatively to the carrier 34 and disc 50, and the planet gears 35 against rotation relatively to the carrier 34. At the same time, the gears 35 are locked against rotation relatively to the gear 33, so that, in effect, the shaft 31 is directly driven by the gear 44. This direct drive is the "high" gear, or high speed drive. The braking pressure on the cone brakes is applied in a gradual and smooth manner, the gear ratio decreasing gradually, in this instance, from 1.7045 to 1.

Figure 13:
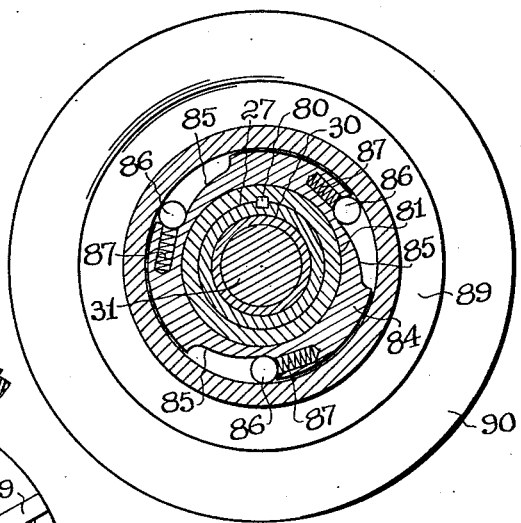
Fig. 13 is a view partly in elevation and partly in section on the line 13—13 of Fig. 2 showing the starting or cranking clutch.

The parts shown in Fig. 13 constitute the starting or cranking clutch, the operation of which will be obvious. These parts constitute a one-way or over-running clutch, which is operative to permit starting of the bicycle motor or engine, without bringing into operation the mechanism of the transmission.

It is thus apparent that once the bicycle is in motion, the gears are automatically changed without application or release of the motor or engine from the driving components.

The transmission has a high mechanical efficiency, is of simple, yet rugged construction, and can be manufactured at relatively low cost.

It is to be understood that the form of my invention, herewith shown and described, is to be taken as a preferred example, of the same, and that various changes in the shape, size and arrangement of parts may be resorted to, without departing from the spirit of my invention or the scope of the subjoined claims.

Having thus described my invention, I claim:

1. In a transmission unit of the character described, a clutch housing having an axial opening therein, a disk-like clutch plate disposed in said opening and having axially extending arms provided with tapered clutch teeth, a multiplicity of clutch weights disposed within said housing and adapted by centrifugal action to engage the walls of said housing, means for drivingly connecting said clutch plate and weights, and tension spring means encircling the outer peripheral portions of said clutch weights for resisting said centrifugal action and operative at predetermined speeds of the clutch plate to force said clutch weights into engagement with said clutch teeth, said clutch teeth operative to centralize said clutch weights within said housing axially as said weights come into engagement with the clutch teeth.

2. A unit, as defined in claim 1, in which said housing has oppositely inclined conical surfaces on the interior thereof, and said clutch weights have correspondingly inclined conical surfaces adapted for engagement with said housing surfaces.

3. In a transmission of the character described, a clutch housing having an axial opening therein, a disk-like clutch plate disposed in said opening, a multiplicity of clutch weights disposed within said housing and adapted by centrifugal action to engage the walls of said housing, each of said clutch weights having a radially extending slot in one face thereof, said clutch plate being provided with radially-extending tenons extending into said slots, said tenons constraining said clutch weights to movement in a radial direction only, means extending from said clutch plate operative to centralize said clutch weights within said housing axially as said weights come into engagement with said means, and tension spring means encircling the outer peripheral portions of said clutch weights for resisting said centrifugal action and operative at predetermined speeds of the clutch plate to force said clutch weights into engagement with said first-named means.

4. A unit, as defined in claim 3, in which said first-named means comprises arms extending from said clutch plate in directions parallel with the axis of said clutch plate, said arms provided with clutch teeth, and said clutch weights having recesses of V-shaped cross-section in their inner peripheral faces, said clutch teeth being of similar V-shaped cross-section adapted for engagement with the walls of said recesses.

5. A unit, as defined in claim 3, in which said spring means comprises a garter coil extension spring encircling said clutch weights.

6. A unit, as defined in claim 5, in which said clutch weights have recesses in their outer peripheral faces, and said garter spring is disposed in said recesses.

References Cited in the file of this patent

UNITED STATES PATENTS

| Number | Name | Date |
|---|---|---|
| 1,032,524 | Wiard | July 16, 1912 |
| 1,279,906 | Read et al. | Sept. 24, 1918 |
| 1,311,236 | Kittredge | July 29, 1919 |
| 1,379,265 | Kalteyer | May 24, 1921 |
| 1,623,862 | Broussouse | Apr. 5, 1927 |
| 1,736,680 | Toliver | Nov. 19, 1929 |
| 1,797,826 | Gage | Mar. 24, 1931 |
| 1,926,483 | Hatcher | Sept. 12, 1933 |
| 2,042,861 | Pehl | June 2, 1936 |
| 2,174,835 | Rainsford | Oct. 3, 1939 |